(12) United States Patent
Thorsoe

(10) Patent No.: US 9,837,823 B2
(45) Date of Patent: Dec. 5, 2017

(54) BATTERY CONTROL SYSTEM

(71) Applicant: Nilfisk-Advance A/S, Brondby (DK)

(72) Inventor: Jan Thorsoe, Svenstrup J (DK)

(73) Assignee: NILFISK A/S (DK)

( * ) Notice: Subject to any disclaimer, the term of this patent is extended or adjusted under 35 U.S.C. 154(b) by 682 days.

(21) Appl. No.: 14/240,835

(22) PCT Filed: Sep. 26, 2012

(86) PCT No.: PCT/DK2012/000106
§ 371 (c)(1),
(2) Date: Feb. 25, 2014

(87) PCT Pub. No.: WO2013/044917
PCT Pub. Date: Apr. 4, 2013

(65) Prior Publication Data
US 2014/0210265 A1 Jul. 31, 2014

(30) Foreign Application Priority Data

Sep. 27, 2011 (EP) ..................................... 11388004

(51) Int. Cl.
*H02J 4/00* (2006.01)
*H02J 7/00* (2006.01)

(52) U.S. Cl.
CPC ............. *H02J 4/00* (2013.01); *H02J 7/0011* (2013.01); *H02J 7/0068* (2013.01); *H02J 2007/0098* (2013.01); *Y10T 307/344* (2015.04)

(58) Field of Classification Search
CPC combination set(s) only.
See application file for complete search history.

(56) References Cited

U.S. PATENT DOCUMENTS 6,501,249 B1    12/2002  Drori
6,741,065 B1 *   5/2004  Ishii ................... B60L 11/1816
                                                              320/122

(Continued)

FOREIGN PATENT DOCUMENTS

JP      2000 294298 A      10/2000
WO    WO2007/069860 A1      6/2007
WO    WO2009/128082 A1     10/2009

OTHER PUBLICATIONS

International Search Report, for PCT/DK2012/00106, 3 pages, dated Jun. 13, 2013.

(Continued)

*Primary Examiner* — Jeffrey Shin
(74) *Attorney, Agent, or Firm* — Ware, Fressola, Maguire & Barber LLP

(57) ABSTRACT

A method and a system for controlling the charging and discharging of one or more battery packs (8) connected to a power source (7) or an apparatus (9) driven by the battery packs. The battery pack (8) comprises a number of battery cells connected to two or more terminals for establishing an electrical connection with the power source or the apparatus. The electronic system (2) for controlling the charging of the battery pack (8) and the electronic system (6) for controlling the operation of the apparatus (9) are integrated into the battery pack (8). The battery pack (8) comprises a communications interface for communicating with other battery packs (8) and generates a charging and discharging pool, where the most effective battery pack (8) to charge or discharge is charged and discharged first.

8 Claims, 2 Drawing Sheets

(56) References Cited

U.S. PATENT DOCUMENTS

| | | |
|---|---|---|
| 8,319,475 B2 | 11/2012 | Choksi et al. |
| 2004/0121223 A1 | 6/2004 | Kim |
| 2004/0217737 A1 | 11/2004 | Popescu |
| 2006/0087286 A1 | 4/2006 | Phillips et al. |
| 2007/0108942 A1 | 5/2007 | Johnson et al. |
| 2009/0220825 A1* | 9/2009 | Nakashima ......... H01M 10/441 429/7 |
| 2010/0097034 A1* | 4/2010 | Shu ..................... H02J 7/0004 320/126 |
| 2013/0148283 A1* | 6/2013 | Forutanpour ...... G01R 31/3606 361/679.31 |

OTHER PUBLICATIONS

European Search Report, for EP11 38 8004, 2 pages, dated May 2, 2012.

\* cited by examiner

BATTERY CONTROL SYSTEM

CROSS REFERENCE TO RELATED APPLICATIONS

This application is a national stage of PCT International application no. PCT/DK2012/000106, filed 26 Sep. 2012, which claims priority in European Patent application no. EP 11388004, filed 27 Sep. 2011, the contents of these applications being hereby incorporated by reference.

TECHNICAL FIELD

The present invention relates to a battery pack comprising a number of battery cells connected to two or more terminals for establishing an electrical connection with a power source or a battery-driven apparatus, a first electronic system for measuring one or more parameters on the battery cells, and a communications interface for communicating with at least one external device.

The present invention also relates to a method of controlling the charging and discharging of battery packs comprising one or more battery packs, and a power source or a battery-driven apparatus having two or more terminals for establishing an electrical connection with the battery pack.

The present invention further relates to a power source for charging one or more battery packs comprising two or more terminals for establishing an electrical connection with the battery pack, a connection to an external power supply, and one or more recesses for receiving the battery packs. The present invention also relates to an apparatus driven by one or more battery packs comprising a number of modules arranged inside the apparatus and configured to perform a desired function, one or more user interfaces for controlling the operation of the apparatus, and one or more recesses or compartments for receiving the battery packs.

BACKGROUND

Battery-driven appliances, such as vacuum cleaners, lawn mowers and hand tools, are becoming increasingly popular. Vacuum cleaners like GD 911 or Backuum from the applicant, lawn mowers like Rotak 34 LI from Bosch, or hand-held power tools are examples of such appliances.

An appliance like that has three major parts: a battery pack, a charger for the battery, and the appliance it self. Such appliances usually have three different electronic systems, which are used for controlling the discharge and re-charge of the appliance. The first electronic system is part of the battery and controls or monitors the temperature and voltage of the cells inside the battery. The second electronic system is normally part of the charger and controls the charging voltage and current supplied to the battery during re-charging. The third electronic system is part of the appliance and comprises an on/off switch and control means for controlling features like revolution speed, soft start of the motor, automatic switching between battery packs, protection against deep discharge of the battery pack, or other control features.

In some stick-type vacuum cleaners the first and second electronic systems are omitted, so that the charger is coupled directly to the battery in the cleaner without having any intelligence controlling the charging of the battery. These models have the disadvantage that the charging (and discharging) of the battery cannot be adjusted according to the performance of the battery.

EP 2014423 A2 discloses a charger for charging various types of battery packs, which uses a wireless or electrical connection to communicate with the individual battery packs. The charger comprises an identification module, which is capable of receiving the identification information or detecting the identification means from the battery pack. The battery packs are charged or discharged according to their characteristics, which are transmitted to and from the battery to the charger or the power tool.

US 2004/0121223 A1 and WO 2009/128082 A1 both disclose a battery pack having a plurality of battery cells connected to a plurality of switches controlled by a controller inside the battery. The controller uses the switches to selectively charge or discharge the battery cells according to the measured voltage of each cell or the required load configuration. The battery pack is connected to an external charger or load device, which transmits commands to the controller inside the battery.

US 2004/0217737 A1 relates to cordless power systems and more particularly to a controller system in which the cordless system components include a cordless power device, a battery pack and a charger. The electronic system (204), which controls the charging of the battery pack, is placed outside the battery pack itself just as the electronic system (10) for controlling the external device is placed outside the pack itself, i.e. in the external device. Thus, the battery pack does not contain an electronic system for controlling the charging, neither does it contain an electronic system for controlling the external device.

Instead the battery packs is connected to an external discharge/charge circuitry, which transmits a discharge or charge signal to a switch controller inside the batteries. The switch controller selectively couples the battery pack to the discharge or charge path, while preventing cross-conduction between the battery packs.

US 2006/0087286 A1 discloses a cordless power system. The system includes a cordless power tool a battery pack and a charger. The battery pack is mated with either the cordless tool or the battery charger. Both the battery pack and the battery charger are equipped with an intelligent circuit, i.e. a battery electronic control and a charger electronic control, respectively. Also the power tool is equipped with a tool electronic control. Thus the system comprises at least three different electronic systems each mounted in the three components, i.e. tool, battery pack and charger.

In these configurations, the electronic systems are located in the charger, battery pack and appliance or in the battery pack and the appliance, respectively. This increases the number of components used to control the charging and discharging of the battery pack, which increases the production costs of the major parts. Furthermore, if the charger or the appliance is to be able to handle multiple battery packs at the same time, this requires a number of redundant circuits or systems for charging and discharging the battery packs, which increases the complexity of the systems and the production costs.

SUMMARY OF THE INVENTION

The present invention remedies the drawbacks of the most immediate prior art by providing a battery pack characterized by comprising a second electronic system for controlling the charging of the battery cells in the battery pack, and a third electronic system for controlling the operation of the external apparatus driven by the battery pack. This reduces the number of components used to control the charging and discharging of the battery packs without the need for redundant circuits or systems, which simplifies the construction of the systems and reduces the production costs.

The communications interface is connected to a memory module and a controller, and communicates with at least one other battery pack, as stated in claim 2. The communications interface is configured as a bus interface, i.e. a CAN-bus, or a wireless interface, as stated in claim 3. This enables an external service operator to extract statistical information for warrantee issues, determine if the battery pack is worn out or not, or other relevant issues.

The battery pack comprises a unique identification number or identification means. The battery pack comprises a charging and a discharging pool, which are continuously updated during the charging and discharging process. The battery pack comprises a switching module for switching the charging or discharging of the battery cells on or off. This enables multiple battery packs of different technologies, capacities, number of battery cells, and ages to cooperate with same power source or apparatus at the same time, without the supply of power being controlled by the intelligence in the power source or apparatus The electronic systems of the battery pack may be designed to be rearwardly compatible, whereby the battery pack may be used with older systems. Moreover, the battery pack provides the advantage that the first electronic system, the second electronic system and the third electronic system may be included in one integrated circuit or chip or microprocessor. Thus, the entire system comprising a tool and a battery pack and using the battery pack according to the present invention may be produced with lower cost as only one chip is needed to control the electronic systems and this chip may be mounted in the battery pack.

Moreover, the battery pack according to the invention requires no charger, but may be connected directly to a power source to charge the batteries in the battery pack. As the battery pack does not require a charger, the battery pack is very flexible in use.

The present invention also provides a method of controlling the charging and discharging of battery packs, characterized in that the electronic system in the battery pack controls the operation of the power source or the apparatus, and communicates with at least one other battery pack connected to the power source or the apparatus. This reduces the number of components used to control the charging and discharging of the battery packs without the need for redundant circuits or systems, which simplifies the construction of the systems and reduces the production costs.

The battery packs transmit their charging or discharging information to each other, and generates a charging or discharging pool. The battery packs monitor each other and continuously update the charging or discharging information stored in the charging or discharging pool. The order of the battery packs in the charging or discharging pool is prioritized according to a number of criteria, i.e. discharge status, actual temperature, capacity size, cell technology, age, or internal impedance. The battery packs are automatically included or excluded from the charging or discharging pool, when they are connected to or disconnected from the charger or the apparatus. This enables multiple battery packs of different technologies, capacities, number of battery cells, and ages to cooperate with same power source or apparatus at the same time, without the supply of power being controlled by the intelligence in the power source or apparatus.

Charging is started on the battery pack which is the most effective one to charge first, until it is determined that its more effective to charge another battery pack, following which the charging is switched to that battery pack until all battery packs are fully charged. Discharging is started on the battery pack which is the most effective one to discharge first, until it is fully discharged, following which the discharging is switched to another battery pack until all battery packs are fully discharged. This provides a fast and effective method of charging the battery pack and provides a more effective method of controlling the discharge of the battery packs.

The present invention also provides a power source characterized in that the electronic system for controlling the operation of the power source is located in the battery pack, and an apparatus characterized by the user interfaces being connected to an electronic system, which is located in the battery pack and controls the operation of the apparatus. This enables the power source and apparatus to be formed as a simple and inexpensive power source or apparatus, which are cheaper to manufacture since they do not contain any intelligence (control means) controlling the supply of power. The size may furthermore be reduced, since the number of components located in the power source is reduced.

BRIEF DESCRIPTION OF THE DRAWINGS

The embodiments of the invention will now be described with reference to the drawings, in which.

DESCRIPTION OF THE EXEMPLARY EMBODIMENTS

Figure 1:
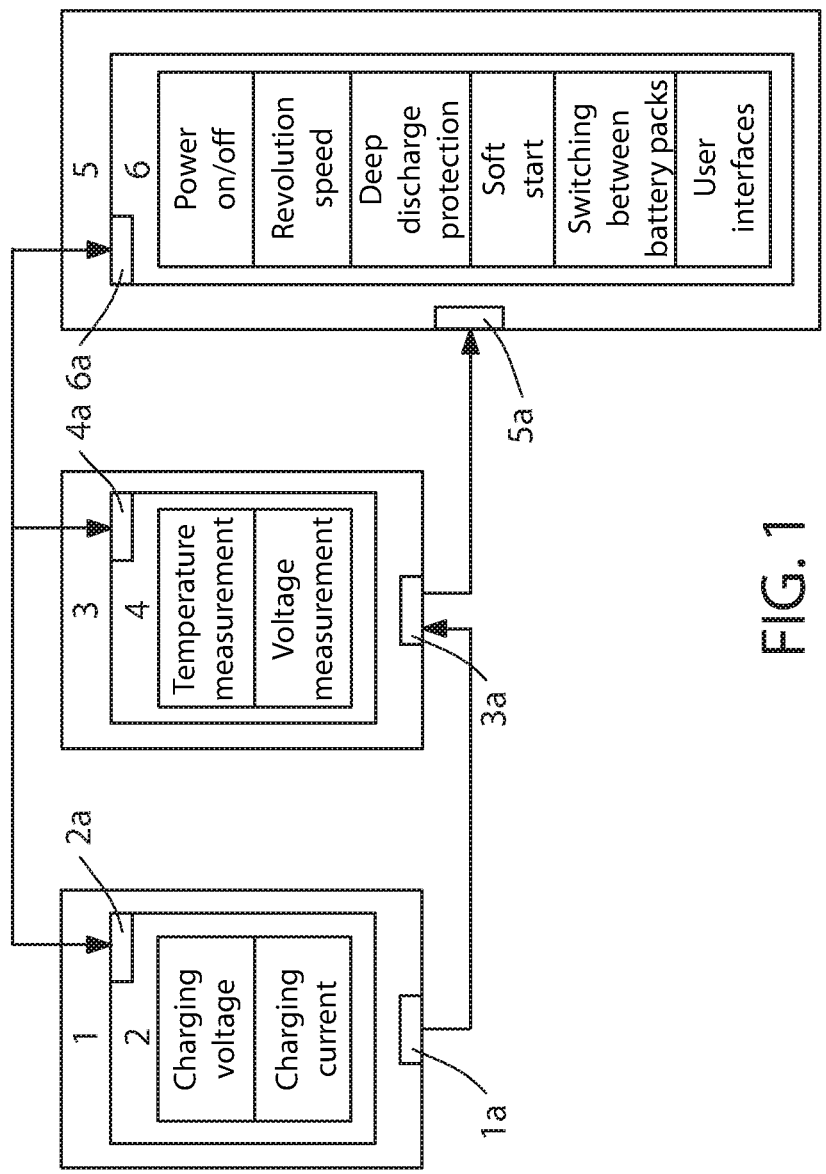
FIG. 1 shows a conventional configuration of the charger, the battery pack and the apparatus.

FIG. 1 shows a conventional configuration of the charger, the battery pack, and the apparatus. The charger 1 comprises a first housing having one or more recesses configured to receive one or more battery packs 3 having the same or different configurations. The first housing may be connected to a wired connection, i.e. a power cable, which is then coupled to an external power supply, i.e. the mains, via a power socket or the like. The recesses may comprise two or more terminals 1a, which are configured to establish an electrical connection between the battery pack 3 and the charger 1 when the battery pack is placed in a recess in the charger. Alternatively, the charger 1 may be coupled directly to the power socket and coupled to the battery packs 3 by a second connection, i.e. a wired or wireless connection. The first electronic system 2 for controlling the charging (voltage and current) of the battery pack 3 may be integrated into the housing of charger 1. The electronic system 2 may alternatively also comprise circuitry for discharging the battery pack 3, which may be performed before the charging process. Alternatively, the electronic system 2 may comprise a communications interface 2a, i.e. a wired or wireless interface, for communicating with a second electronic system 4 in the battery pack.

The battery pack 3 comprises a second housing having two or more terminals 3a for establishing an electrical connection with the charger 1 or the apparatus 5. The battery pack 3 comprises a number of batteries and/or battery cells, which are interconnected to form the desired battery configuration. The batteries and/or battery cells are connected to the terminals 3a placed on the outer side of the second housing. The second electronic system 4 for measuring the temperature and voltage of the batteries and/or battery cells may be integrated into the housing of the battery pack 3. The electronic system 4 may comprise a controller and/or a switch module, which is connected to the controller and the batteries and/or battery cells. The controller uses the switch module to form the desired battery configuration by selectively interconnecting the individual sub-units of the battery pack 3. Alternatively the electronic system 4 may comprise a communications interface 4a, i.e. a wired or wireless interface, for communicating with the electronic system 2 in the charger or a third electronic system 6 in the apparatus 5. The electronic system 4 may transmit the discharge or charge characteristics of the battery pack 3 to the charger 1 or the apparatus 5 automatically when the two units are connected or upon request. The electronic systems 2, 6 may then use the characteristics to control the charging/discharging (the supply of power) of the battery pack 3.

The apparatus 5 comprises a third housing and a number of modules and elements configured to perform one or more functions, i.e. cleaning, blowing, cutting, lighting, drilling, screwing, sawing, or other desired functions. The apparatus comprises one or more recesses, compartments, or the like for receiving the battery pack 3. The recesses/compartments may comprise two or more terminals 5a, which are configured to establish an electrical connection between the battery pack 3 and the apparatus 5 when the battery pack is placed in the recess/compartment. Alternatively the battery pack 3 may be connected to the apparatus 5 via another wired or a wireless connection. The third electronic system 6 for controlling the operation of the apparatus may be integrated into the housing of the apparatus 5, and is connected to one or more user interfaces placed on the outer side of the housing of the apparatus 5. The user interfaces, i.e. control buttons, rotary knobs, sliders, touch sensitive pads, or any combinations of these, are used for controlling the operation of the apparatus 5. Alternatively, the electronic system 6 may comprise a communications interface 6a, i.e. a wired or wireless interface, for communicating with the second electronic system 4 in the battery pack 3.

The electronic systems 2, 4, 6 comprise suitable control means, i.e. a processor/controller, logical circuitry or similar control means, for controlling the operation of one or more modules arranged inside the charger 1, the battery pack 3, or the apparatus 4.

Figure 2:
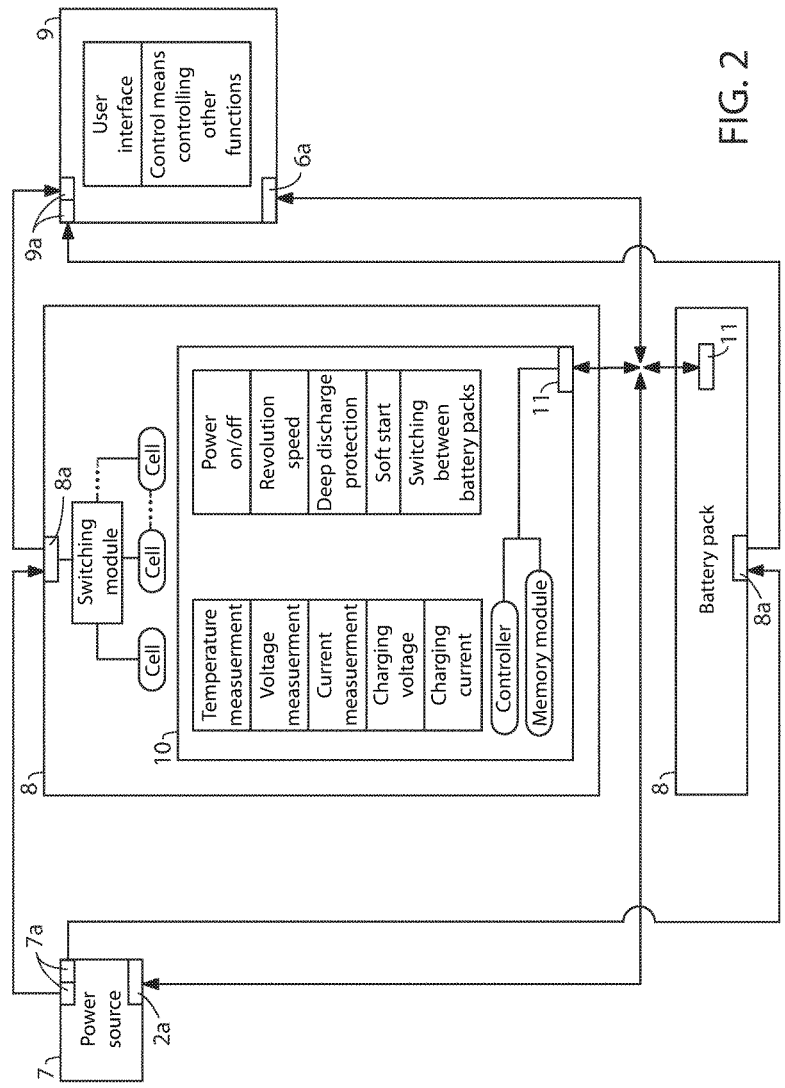
FIG. 2 shows the configuration of the power source, the battery pack, and the apparatus according to the invention.

FIG. 2 shows an exemplary configuration of the power source, the battery pack, and the apparatus according to the invention. The first, second, and third electronic systems 2, 4, 6 are integrated into the battery pack 8, so that they form a single electronic system 10 which controls the charging and discharging of the battery pack 8. This reduces the number of components used for controlling the charging and discharging of the battery packs without the need for redundant circuits or systems, which simplifies the construction of the systems and reduces the production costs.

The electronic system 10 in the battery pack 8 may comprise a controller, which is connected to a memory module, which is used for storing information regarding the status of the battery pack 8 and information received from other battery packs. Each battery pack 8 may comprise a unique identification number, which may be stored in the memory module, or other identification means, which may be transmitted to other battery packs 8 via the communications interface 11 in the battery pack 8. The communications interface 11 is connected to the controller and the memory module, and may be configured as a CAN-bus or another bus.

An external service operator may extract statistical information stored in battery pack 8 via the communications interface 11. The statistical information may be date of manufacture, date of first use, number of discharge/charge cycles, runtimes and charge times, actual performance compared to new cells, actual capacity, and other relevant information. The external operator may use the statistical information for warrantee issues, determine if the battery pack is worn out or not, or other relevant issues.

The power source 7 may have the same configuration as the charger 1 but without the first electronic system 2. The electrical components generating the charging voltage and current may be located in the power source 7, which are connected to the electronic system 10 located in the battery pack 8, which controls the charging of the battery pack 8, when the battery pack 8 is connected or coupled to the power source 7. Alternatively, the electrical components may also be located in the battery pack 8. This enables the power source 7 to be formed as a simple and inexpensive power source, with no intelligence (control means), which makes it cheaper to manufacture since it does not contain any intelligence. The size of the power source may furthermore be reduced since the number of components located in the power source is reduced.

The power source 7 may comprise a number of recesses for receiving one or more battery packs 8 or may be coupled to a number of battery packs 8 via the second connection. Each recess comprises two or more terminals 7a for establishing an electrical connection between the power source 7 and the battery pack 8 via two or more terminals 8a located in the battery pack 8. This enables multiple battery packs 8 to be coupled/connected to and to cooperate with the power source 7 at the same time, without any intelligence in the power source 7 controlling the supply of power or switching between battery packs 8. The multiple battery packs 8 may be of different technologies, capacities, number of battery cells, and ages.

The battery pack 8 may use its communications interface 11 to communicate with other battery packs 8 connected or coupled to the power source 7 via one or more communications paths in the power source 7 or a wireless connection. The communications path may be configured as a CAN-bus or another bus, which may be connected to a communications interface located in each of the recesses. The battery packs 8 may transmit their identification information and/or charging information to each other in order to establish a charging pool or list, which may be stored in the electronic system 10 in each battery pack 8. This enables the battery packs 8 to select a battery pack 8, which is the most effective to charge first, and then start charging on that one. Charging will continue on the selected battery pack 8 until it is more effective to charge another battery pack 8, the charging will then automatically switch to that particular battery pack 8. The battery packs 8 may continuously monitor each other, i.e. exchange charging information, and automatically switch charging to the most effective one, until all battery packs 8 are fully charged. The charging order of the battery packs 8 in the charging pool or list may be prioritized according to a number of criteria, i.e. charge status, actual temperature, capacity size, cell technology, age, internal impedance, or other criterias. Battery packs 8 added to or removed from the power source 7 by the user will automatically be included in or excluded from the charging pool or list.

The apparatus 9 may have the same configuration as the apparatus 5 but without the third electronic system 6. The mechanical/electrical elements and components needed to perform a specific function in the apparatus 9 are arranged in a number of modules inside the apparatus 9. These modules are then connected to and controlled by the electronic system 10 located in the battery pack 8 when the battery pack 8 is connected to the apparatus 9. The electronic system 10 controls the operation of the apparatus, which in turn determines the load requirements (the supply of power) for the battery pack 8. When connected to the apparatus 9, the electronic system 10 is also connected to the user interfaces located on the apparatus, which are used for controlling the operation of the apparatus 9. The electronic system 10 controls the supply of power to the modules, which may be determined according to inputs from the modules and/or the user interfaces. This enables the apparatus 9 to be formed as a simple and inexpensive apparatus, which is cheaper to manufacture since it does not contain any intelligence (control means) controlling the supply of power to the modules. The size of the apparatus may furthermore be reduced, since the number of components located in the apparatus is reduced.

The apparatus 9 may comprise a number of recesses, compartments or the like for receiving one or more battery packs 8 or may be coupled to a number of battery packs 8 via another wired or a wireless connection. Each recess comprises two or more terminals 9a for establishing an electrical connection between the apparatus 9 and the battery pack 8 via terminals 8a. This enables multiple battery packs 8 to be coupled or connected to the apparatus 9 at the same time, without any intelligence in the apparatus controlling the supply of power from the battery packs or switching between battery packs. The multiple battery packs 8 may be of different technologies, capacities, number of battery cells, and ages. The user may upgrade the apparatus 9 with extra battery packs if needed, since old and new, high and low capacity battery packs are able to cooperate with the same apparatus.

The battery pack 8 may use its communications interface 11 to communicate with other battery packs 8 connected to the apparatus 9 via one or more communications paths in the apparatus or a wireless connection. The communications path may be configured as a CAN-bus or another bus, which may be connected to a communications interface located in each of the recesses or compartments. The battery packs 8 may transmit their identification information and/or discharging information to each other in order to establish a discharging pool or list, which may be stored in the electronic system 10 in each battery pack 8. This enables the battery packs 8 to select a battery pack 8 which is most effective to discharge first, and then start discharging from that. Discharging continues from the selected battery pack 8 until the battery pack 8 is fully discharged, and the discharging will then automatically switch to another battery pack 8 without interrupting the function of the apparatus. The battery packs 8 may continuously monitor each other, i.e. exchange discharging information, and automatically switch discharging to the battery pack 8 which is the most effective to discharge, until all battery packs 8 are fully discharged. The discharging order of the battery packs 8 in the discharging pool or list may be prioritized according to a number of criteria, i.e. discharge status, actual temperature, capacity size, cell technology, age, internal impedance, or other criteria. Battery packs 8 added to or removed from the apparatus by the user will automatically be included in or excluded from the discharging pool or list.

The apparatus 9 comprises a number of modules configured to perform one or more functions, i.e. cleaning, blowing, cutting, lighting, drilling, screwing, sawing, or other desired functions. The modules are controlled by the electronic system 10 in the battery pack 8, which may control features such as power on/off, revolution speed of motor, soft start-up, automatic switching between battery packs, deep discharge protection, and other features. In a preferred embodiment the apparatus 9 only comprises an of/off button and a rotary knob or slider for controlling the operation of the apparatus 9. In a second preferred embodiment, the apparatus 9 also comprises a motor, where the rotary knob or slider is used for controlling the revolution speed of the motor, while the on/off button is used for switching power on and off. In another preferred embodiment the apparatus 9 comprises components, such as active loudspeakers, a central processing unit (i.e. a computer), a navigation system (i.e. using GPS), radio receivers/transmitters, and/or a display (i.e. LCD or LED), for operating the apparatus 9 and an optional motor module, which may drive one or more modules and/or move the apparatus 9. These components may be controlled by the electronic system 10 or by control means, i.e. the central processing unit, located in the apparatus 9. The control means communicates with the electronic system 10 and controls/performs functions not related to the supply of power.

The apparatus 9 has a certain run time with a certain type of battery pack 8, which is typically minutes or hours depending on the load requirements. This run time may be extended from minutes or hours to indefinite, if the external power supply is integrated into the apparatus 9 or connected to the apparatus 9 by a wired connection.

Alternatively the power source 7 may be integrated into the apparatus 9 and connected to the external power supply by a wired connection. If the power source 7 is integrated into the apparatus 9 and the battery packs 8 are connected to the apparatus, one or more battery packs 8 may be charged while the apparatus 9 receives power from another battery pack 8 or the external power supply. The discharging and charging pools or lists in the battery packs 8 may be updated continuously during the charging and discharging process.

The battery control system shown in FIG. 2 enables the external power supply to be configured as a simple power supply without extra intelligence. Furthermore, the apparatus 9 may be configured without any switching circuitry between the external power supply and the battery packs 8 and without the need of two windings on the motor.

The invention claimed is:
1. A battery pack (8) comprising:
 a number of battery cells connected to two or more terminals (8a) for establishing an electrical power connection with a power source (7), the two or more terminals also for establishing an electrical rower connection with a battery-driven apparatus (9);
 an electronic system (10) comprising
  a) a first electronic system (4) for measuring one or more parameters of the battery cells,
  b) a second electronic system (2) for controlling the charging, discharging, or both charging and discharging of the battery cells in the battery pack (8), and
  c) a third electronic system (6) for controlling functional modules of the battery-driven apparatus (9) that cause the battery-driven apparatus (9) to perform corresponding functions related to operation of the battery-driven apparatus (9); and
 a communications interface for communicating via one or more communication paths with:
  a) the power source (7) when the charging, discharging, or both charging and discharging of the battery cells is controlled by the second electronic system (2),
  b) the battery-driven apparatus (9) when the operation of the battery-driven apparatus (9) is controlled by the third electronic system (9) to perform the corre- sponding functions of the functional modules related to the operation of the battery-driven apparatus (9), and c) at least one other battery pack (8) of a number of battery packs when an electrical power connection is established between, the battery pack and the number of battery packs including the at least one other battery pack (8) and the power source (7) or the battery-driven apparatus (9), or both the power source (7) and the battery-driven apparatus (9), wherein the battery pack (8) exchanges charging or discharging information, or both, with the number of battery packs including the at least one other battery pack (8) and generates a charging or discharging list, the order of battery packs on the list being prioritized according to a number of criteria selected from the group consisting of discharge status, actual temperature, capacity size, cell technology, age, and internal impedance.

2. The battery pack (8) according to claim 1, further comprising a switching module that switches the charging or discharging of the battery cells on or off in response to a position of the battery pack (8) on the charging or discharging list.

3. The battery pack (8) according to claim 1, wherein the battery pack (8) monitors the at least one other battery pack (8) when an electrical power connection is established between the at least one other battery pack (8) and the power source (7), the battery-driven apparatus (9), or both the power source (7) and the battery-driven apparatus (9) and continuously updates the charging or discharging information stored in the charging or discharging list.

4. The battery pack (8) according to claim 1, wherein the third electronic system (6) communicates with one or more user interfaces that are part or parts of the battery-driven apparatus, the functional modules, or both the user interfaces and the functional modules of the battery-driven apparatus (9); and wherein the third electronic system (6) controls both power supplied to the battery-driven apparatus and the functional modules of the battery-driven apparatus (9) upon receipt of input from the one or more user interfaces, the function modules, or both the one or more user interfaces and the functional modules of the apparatus (9).

5. The battery pack (8) according to claim 1, wherein the battery pack and the at least one other battery pack are automatically included in or excluded from the charging or discharging list, respectively, when they are connected to or disconnected from the apparatus (9).

6. The battery pack (8) according to claim 1, wherein the battery-driven apparatus (9) receives one or more of the number of battery packs placed in corresponding battery-driven apparatus recesses (9a), each battery-driven apparatus recess having terminals corresponding to the two or more terminals (8a), wherein the number of battery packs are separable from the battery-driven apparatus by withdrawal from the corresponding battery-driven apparatus recesses (9a).

7. The battery pack of claim 6, wherein the power source receives one or more of the number of battery packs in corresponding power source recesses (7a), each power source recess having terminals corresponding to the two or more terminals (8a), and wherein the number of battery packs are separable from the power source (7).

8. The battery pack of claim 6, wherein the battery-driven apparatus is a battery-driven appliance or hand tool with the recesses in the appliance or hand-tool.

* * * * *